United States Patent [19]

Gouali et al.

[11] Patent Number: 4,630,255
[45] Date of Patent: Dec. 16, 1986

[54] OPTICAL MULTIPLEXER-DEMULTIPLEXER FOR USE WITH OPTICAL FIBER WAVELENGTHS

[75] Inventors: Mohamed Gouali; Georges Folcke, both of Paris, France

[73] Assignee: Lignes Telegraphiques et Telephoniques L.T.T., Conflans Sainte Honorine, France

[21] Appl. No.: 687,897

[22] Filed: Dec. 31, 1984

[30] Foreign Application Priority Data

Jan. 3, 1984 [FR] France .............................. 84 00035

[51] Int. Cl.$^4$ .............................................. H04B 9/00
[52] U.S. Cl. ...................................... 370/3; 350/96.15
[58] Field of Search ............... 350/96.15, 96.16, 96.18, 350/96.19; 455/607, 612; 370/1, 2, 3

[56] References Cited

U.S. PATENT DOCUMENTS

4,452,505  6/1984  Gasparian ....................... 350/96.16

FOREIGN PATENT DOCUMENTS

| 53324 | 6/1982 | European Pat. Off. | ......... 350/96.15 |
| 2334967 | 12/1975 | France . | |
| 56-11409 | 2/1981 | Japan | ................. 350/96.15 |
| 56-35105 | 4/1981 | Japan | ................. 350/96.15 |

OTHER PUBLICATIONS

Winzer et al.-"Single Mode and Multimode"-Applied Optics vol. 20, #18-15 Sep. 1981, pp. 3128-3135.
Winzer-"WDM Status and Trends"-Conference Europeenne Sur Les Communications Optiques-21,22 Sep. 1982, pp. 305-314.
Miyauchi et al.-"Compact Wavelength" Optics Letters vol. 5, No. 7. Jul. 1980, pp. 321-322.

*Primary Examiner*—Joseph A. Orsino, Jr.
*Attorney, Agent, or Firm*—Sughrue, Mion, Zinn, Macpeak & Seas

[57] ABSTRACT

The invention relates to an optical wavelength multiplexer-demultiplexer using optical fibers. For a bidirectional three-channel link with two go channels and one return channel the multiplexer-demultiplexer comprises a chamfered link fiber (30) provided with an interference filter (25) and optically coupled with three intermediate fibers (13, 14, 15). A first intermediate fiber (13) is chamfered and fitted with an interference filter (20) and has an optical axis which intersects the optical axis of the link fiber at a given angle ($\theta$), while a second intermediate fiber (14) is coupled to the chamfered fiber, with the filter (20) providing multiplexing and demultiplexing between the two go channels. A third intermediate fiber (15 is applied to the cylindrical wall of the link fiber to receive or tansmit the return channel via the filter (25). The multiplexer-demultiplexer is applicable to optical fiber telecommunication systems.

10 Claims, 5 Drawing Figures

OPTICAL MULTIPLEXER-DEMULTIPLEXER FOR USE WITH OPTICAL FIBER WAVELENGTHS

The present invention relates to an optical multiplexer-demultiplexer which may be unidirectional or bidirectional for at least three wavelengths and using optical fibers.

BACKGROUND OF THE INVENTION

In optical transmission systems it is necessary to multiplex signals of different wavelengths each modulated with data for transmission into a single main optical fiber known as a link or a transmission fiber, and vice versa. Such optical systems are said to be unidirectional when the different wavelengths propagate in a single direction along the link fiber and they are said to be bidirectional when the link fiber transmits a plurality of "go" wavelengths in one direction and a second plurality of different "return" wavelengths in the other direction. At present, bidirectional optical link systems are used in numerous applications such as telematics, telephone transmission, or teledistribution networks in which a central station communicates with peripheral stations constituted by subscriber transmitter-receiver apparatuses.

The Applicants' French patent application No. 83 07795 filed May 10, 1983 and entitled "Wavelength multiplexing and demultiplexing device using optical fibers" describes an optical multiplexer-demultiplexer having three wavelength transmission paths or channels using intermediate optical fibers in combination with a single link fiber. The three channels may be unidirectional, or there may be two go channels and one return channel. As described in this patent application, a three-channel unidirectional link has a link fiber which has a roof-shaped chamfer at each end, and three intermediate optical fibers each transmitting an optical signal of a given wavelength are optically coupled to each chamfered end of the link fiber. These wavelengths are multiplexed at one of the chamfered ends of the fiber by wavelength distribution in the link fiber, while they are demultiplexed at the other chamfered end of the fiber by selecting a wavelength by means of multi-layer dielectric interference filters deposited on the intermediate fibers. Likewise, for a bidirectional, three-channel link having two go channels and one return channel, the wavelengths are multiplexed and demultiplexed as before using two intermediate optical fibers coupled to each of the roff-shaped chamfered ends of the link fiber, with one of the intermediate fibers being bidirectional and each of the intermediate fibers including an interference filter.

However, such a three-channel multiplexer-demultiplexer device is very difficult to make in practice in that it is technologically difficult to chamfer the ends of an optical fiber into a roof-shape which is as optically perfect as possible. Consequently, the manufacturing cost of such a device is relatively high.

The aim of the present invention is to provide an optical multiplexer-demultiplexer in a simple and cheap manner, said multiplexer being essentially a three-channel device, and being achieved by coupling at least three intermediate fibers to the same end of a link fiber in a manner which is particularly satisfactory both from the optical point of view and from the mechanical point of view. This embodiment does not require complicated chamfering, is equally applicable to unidirectional and to bidirectional links, and is compact, i.e. it takes up little room.

SUMMARY OF THE INVENTION

Thus, for a unidirectional link, the present invention provides a multiplexer-demultiplexer for at least three wavelengths and comprising a link optical fiber having at least three intermediate fibers each transmitting an optical signal at a given wavelength coupled to each of its ends. The improvement in this multiplexer-demultiplexer lies in each end of the link fiber being chamfered at a given angle and being coupled to a first intermediate fiber which is also chamfered at one of its ends so that the respective axes of the link fiber and the first intermediate fiber are different, in a second intermediate fiber being coupled to the chamfered end of the first intermediate fiber, in a third intermediate fiber being applied to the cylindrical wall of the link fiber by optical means having a refracted index matching that of each of said two fibers, and in interference filters being deposited on the chamfered ends of the link fiber and the first intermediate fiber to perform wavelength multiplexing-demultiplexing.

In a similar manner, for a bidirectional link having at least three channels including two channels and one return channel, i.e. for a single link fiber transmitting "go" wavelengths in one direction and one "return" wavelength in the other direction, a multiplexer-demultiplexer in accordance with the invention is similar to that described above, with the first and second intermediate fibers each transmitting an optical signal at one of the go wavelengths and with the third intermediate fiber transmitting an optical signal at the return wavelength.

Preferably, the optical coupling between the link fiber and each of the first and second intermediate fibers is maximized for an intersection at a given angle of the respective longitudinal axes of the link fiber and the first intermediate fiber.

BRIEF DESCRIPTION OF THE DRAWINGS

Embodiments of the invention are described by way of example with reference to the accompanying drawings, in which.

MORE DETAILED DESCRIPTION

In the various figures, the same references relate to the same components performing the same functions.

Figure 1:
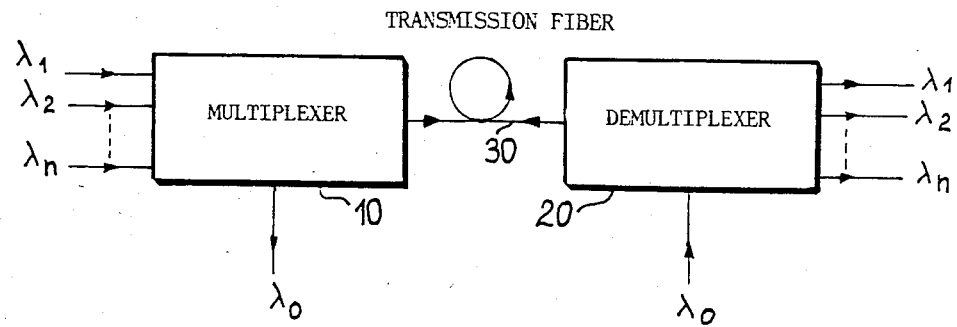
FIG. 1 is a block diagram showing multiplexing-demultiplexing for a bidirectional optical fiber link.

In FIG. 1, the reference 10 indicates a multiplexer for n different wavelengths $\lambda_1, \lambda_2, \ldots \lambda_n$ and 20 designates an associated demultiplexer, e.g. for a teledistribution system using a single main optical fiber 30 known as the link or transmission fiber.

The optical link is unidirectional when the optical fiber 30 transmits in one direction only from the multiplexer 10 towards the demultiplexer 20. It transmits light signals at n wavelengths $\lambda_1, \lambda_2, \ldots \lambda_n$ emitted by photo-emitting diodes such as laser diodes or light-emitting diodes (LEDs) (not shown). These signals are received by photo-sensitive diodes, such as avalanche photodiodes for example or PIN type diodes (not shown).

In contrast, the link is said to be bidirectional when the optical fiber transmits light signals at n different go wavelengths $\lambda_1, \lambda_2, \ldots \lambda_n$ in one direction and one or more return wavelengths in the opposite direction represented by a single wavelength $\lambda_0$ in FIG. 1. This wavelength may be emitted by a photo-emitting diode (not shown) coupled to the demultiplexer 20 and received via a photo-sensitive (not shown) coupled to the multiplexer 10.

Thus, for example in a teledistribution system, the multiplexer-demultiplexer as shown in FIG. 1 is bidirectional having (n+1) transmission channels, i.e. n go channels for transmitting video signals at wavelengths $\lambda_1, \lambda_2, \ldots \lambda_n$ and having one return channel for transmitting an extra signal, such as a remote-control signal for example, at the wavelength $\lambda_0$.

Figure 2:
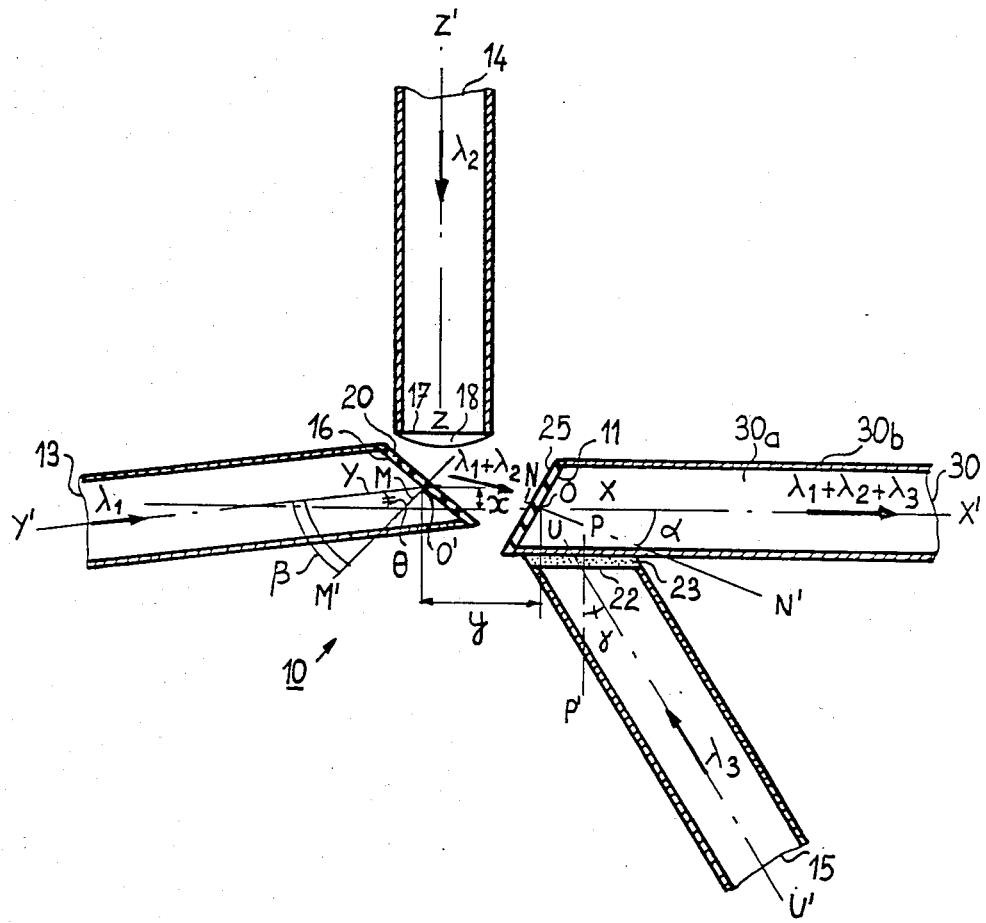
FIGS. 2 and 3 are respective longitudinal sections through a multiplexer and a demultiplexer in accordance with the invention for a three-channel unidirectional link.
Figure 3:
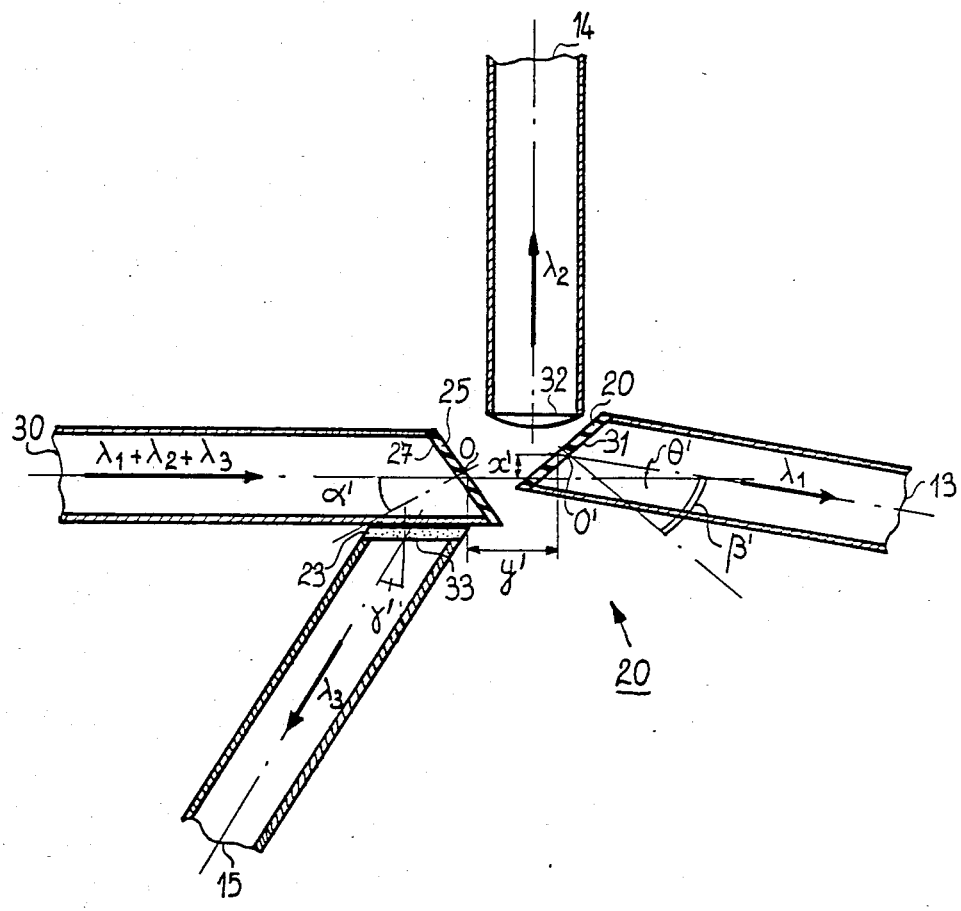

FIGS. 2 and 3 respectively show the multiplexer 10 and the associated demultiplexer 20 in accordance with the invention for use in a unidirectional optical link having three channels and using intermediate optical fibers. The three different wavelengths used $\lambda_1, \lambda_2$ and $\lambda_3$ are respectively equal, for example, to 0.78 $\mu$m, 0.86 $\mu$m, and 1.3 $\mu$m.

For the unidirectional optical multiplexer 10 shown in FIG. 2, the link fiber 30 is a silica fiber of multimode index gradient type having a core 30a whose diameter is equal to 50 $\mu$m for example and having an optical cladding 30b with a diameter of 125 $\mu$m for example. The optical fiber 30 is thus a 50/125 $\mu$m fiber having a numerical aperture of about 0.19.

In accordance with one aspect of the invention, the link fiber 30 has an inlet face 11 which is chamfered at a given angle $\alpha$ between its longitudinal axis XX' and the normal NN' to its inlet face. The angle $\alpha$ is chosen in such a manner as to increase the value of the acceptance angle of the multimode fiber 30 and to achieve a compromise between low insertion loss and minimal crosstalk.

In FIG. 2, the multiplexer 10 includes three intermediate optical fibers or junction fibers referenced 13, 14 and 15. These fibers have respective longitudinal axes YY', ZZ', and UU', and they are optically connected to the link fiber 30, with each of them transmitting one of the three wavelengths $\lambda_1, \lambda_2$ and $\lambda_3$. These three intermediate fibers are, for example, of the same type as the link fiber, i.e. they are 50/25 $\mu$m silica fibers having a gradient index and a numerical aperture of about 0.19.

The intermediate fiber 13 transmits an optical signal at wavelength $\lambda_1$ and has a wavelength emission or outlet face 16 which is chamfered at a given angle $\beta$, e.g. equal to 30°, between its axis YY' and the normal NN' to its outlet face. The respective chamfered faces 11 and 16 of the fibers 30 and 13 are coupled to one another in such a manner that their respective optical axes XX' and YY' are distinct, thus providing a structure with off-centered fibers. The optical axes XX' and YY' may either be parallel and not touching, or else they may intersect.

It should be observed that the chamfered faces of the two off-center fibers 30 and 13 shown in FIG. 2 are disposed sloping in opposite directions from each other thus constituting an air prism model. Naturally, in FIG. 2 as in the other figures, these two chamfered faces could also be parallel, thus forming a parallel face model.

The intermediate fiber 14 transmitting an optical signal at wavelength $\lambda_2$ is optically coupled to the link fiber 30 via the fiber 13. More precisely, the intermediate fiber 14 has an outlet face 17 of right section which is maximally coupled to the chamfered face 16 of the intermediate fiber 13 by means of focusing means constituted, for example, by a microlens 18 glued to the outlet face of the fiber 14.

In FIG. 2 the intermediate fiber 13 has optical filter means on its chamfered face 16 which are constituted, for example, by an interference filter 20 having multiple dielectric layers and designed so as to transmit the wavelength $\lambda_1$ and to reflect the wavelength $\lambda_2$ so that this filter multiplexes the two wavelengths $\lambda_1$ and $\lambda_2$ by wavelength separation and generates an outlet optical signal having two wavelengths $\lambda_1+\lambda_2$ which is intended to penetrate into the link fiber 30 by refraction through its chamfered face 11.

To optimize the coupling between the link fiber 30 and the two intermediate fibers 13 and 14, the fiber 13 is positioned relative to the link fiber 30 in such a manner that the maximum amount of light energy is injected into the link fiber, and also, the fiber 14 is disposed relative to the fiber 13 in such a manner that the maximum light energy at wavelength $\lambda_2$ is injected into the link fiber after reflection on the chamfered face of the fiber 13. This coupling optimization is obtained when the respective optical axes XX' and YY' of the two fibers 30 and 13 intersect at an angle $\theta$, e.g. equal to 30°, over a certain distance x, along a direction orthogonal to the axes of the link fiber between the respective centers 0 and 0' of their chamfered faces, and for a certain distance y in a direction parallel to the axis of the link fiber between said centers 0 and 0'. These three parameters $\theta$, x and y are defined experimentally by drawing three curves of power received in the link fiber at a given wavelength, and the triplet ($\theta$, x, y) used corresponds to the combination giving maximum coupled power between the fibers 13 and 30 and thus the minimum insertion losses.

In FIG. 2, as in the other figures, the positions of the various fibers have been exaggerated in order to clarify the drawings.

Thus, suitable choice for the angle $\theta$ and the distances x and y ensures that the maximum amount of light energy is injected by refraction at both wavelengths $\lambda_1$ and $\lambda_2$ into the link fiber 30, and also ensures that the optical signal at these two wavelengths remains guided inside the link fiber and propagates therealong.

In may be noted that the distance y is also defined to ensure that the multiplexer is compact so as to make it possible for the intermediate fiber 14 to be disposed between the link fiber 30 and the fiber 13 while still being maximally coupled thereto as a function of its chamfer angle $\beta$, and without increasing losses.

As can be seen in FIG. 2, the intermediate fiber 15 transmitting an optical signal at wavelength $\lambda_3$ is optically coupled to the link fiber 30 by being applied against the cylindrical wall thereof. More precisely, the intermediate fiber 15 has an outlet face 22 which is fixed to the side wall of the link fiber by optical indexing matching means for ensuring optical continuity between the two fibers so as to enable an optical signal at wavelength $\lambda_3$ to penetrate into the link fiber. These index matching means may be constituted, for example, by a layer of epoxy resin 23 having an index matching the index of each of the fibers 15 and 30, i.e. equal to or very close to the index of each of them. Thus, by way of example, for silica fibers having a refractive index equal to 1.45, an epoxy resin is chosen having a refractive index over 1.47.

In a first embodiment, the epoxy resin 23 is initially deposited on the side wall of the link fiber 30 and then the intermediate fiber 15 is applied thereto.

In a preferred variant, the outlet face of the intermediate fiber 15 is initially covered in epoxy resin 23, and then the assembly is applied to the side wall of the link fiber 30.

The intermediate fiber 15 is placed relative to the link fiber 30 in such a manner that the optical signal at wavelength $\lambda_3$ after penetrating into the link fiber is reflected on the chamfered face 11 of the link fiber and remains guided therealong during its propagation. To this end, the reflection of the optical signal on the chamfered face of the link fiber is ensured by optical filter means constituted, for example, by an interference filter 23 comprising a multiplicity of dielectric layers deposited on the chamfered face of the fiber 30. The filter 25 is designed in such a manner as to transmit both of the above-mentioned multiplexed wavelengths $\lambda_1$ and $\lambda_2$ and to reflect the wavelength $\lambda_3$ so that all three wavelengths $\lambda_1$, $\lambda_2$, $\lambda_3$ are multiplexed in the link fiber 30 and are wavelength separated therein. Thereafter, the fiber 30 transmits an optical signal including all three multiplexed wavelengths $\lambda_1 + \lambda_2 + \lambda_3$.

Further, the chamfer angle $\alpha$ at the end of the link fiber 30 is such that the optical signal of wavelength $\lambda_3$, after reflection on the chamfered face 11 of the link fiber remains guided therein. By way of example, good multiplexer efficiency has been obtained by the Applicant by using a chamfer angle $\alpha$ equals either to 45° or to 22°. When the angle $\alpha$ is 45°, the outlet face 22 of the intermediate fiber 15 is a right section thereof and the fiber 15 is disposed perpendicularly to the longitudinal axis of the link fiber. In contrast, if the angle $\alpha$ is other than 45°, good coupling between the intermediate fiber 15 and the link fiber 30 is obtained by chamfering the outlet face of the fiber 15 at an angle $\alpha$, e.g. equal to 46°, between the longitudinal axis UU' thereof and the normal PP' to the outlet face.

The demultiplexing of the three wavelengths $\lambda_1$, $\lambda_2$ and $\lambda_3$ is performed by the associated demultiplexer 20 which is shown in FIG. 3 and which is designed in an entirely complementary manner to the multiplexer described with reference to FIG. 2. The structure of the demultiplexer 20 is thus not described in detail since it is completely symmetrical to the structure of the above-described multiplexer.

In FIG. 3, the link fiber 30 has an outlet face 27 which is chamfered at an angle $\alpha'$ which is equal to or different from the angle $\alpha$ defined at the multiplexer, and the three intermediate fibers 13, 14 and 15 have respective inlet faces each of which is intended to receive a respective one of the three wavelengths $\lambda_1$, $\lambda_2$ and $\lambda_3$. The inlet face 31 of the intermediate fiber 13 is chamfered as before at an angle $\beta'$ which may be equal to or different from the angle $\beta$ at the multiplexer, the inlet face 32 of the fiber 14 is a right section and is fitted with a microlens, and the inlet face 33 of the fiber 15 is either a right section for use with a chamfer angle $\alpha'$ equal to 45°, or else a chamfer angle $\alpha'$ equal to or different from the angle $\gamma$ defined at the multiplexer and for use with a chamfer angle $\alpha'$ prime other than 45°.

The coupling between the link fiber 30 and the intermediate fibers 13, 14 and 15 is performed as described above with reference to FIG. 2 and the parameters $\theta'$, $x'$ and $y'$ may be equal to or different from the same parameters at the multiplexer end.

Likewise, and as before, the chamfered face 27 of the link fiber has the same interference filter 25 acting as a selector for transmitting the two wavelengths $\lambda_1$ and $\lambda_2$ and for reflecting the wavelength $\lambda_3$. Thus, the filter 25 generates at the output of the chamfered face of the link fiber 30 an optical signal having two wavelengths $\lambda_1$ and $\lambda_2$, while the optical signal at wavelength $\lambda_3$, after being reflected by the filter, passes through the side wall of the link fiber 30 and penetrates into the fiber 15 by passing through index-matching epoxy resin 23.

It may be observed that the chamfer angle $\alpha'$ of the link fiber 30 is such that the optical signal at wavelength $\lambda_3$ remains guided in the fiber 15 after being reflected by the filter 25 and received by the fiber 15.

In order to improve the efficiency of the demultiplexer, it may be useful to deposit another multilayer dielectric interference filter (not shown) between the epoxy resin 23 and the inlet face of the intermediate fiber 15. This filter is designed to transmit at the wavelength $\lambda_3$ and to reflect at the wavelength $\lambda_1$ and $\lambda_2$, thereby avoiding any rejection of the first two channels onto the third, and thus reducing crosstalk.

As before, the chamfered face 31 of the intermediate fiber 13 has the same interference filter 20 which is designed t transmit the wavelength $\lambda_1$ and to reflect the wavelength $\lambda_2$. Thus, the filter 20 receives by refraction an optical signal at both wavelengths $\lambda_1 + \lambda_2$ from the output of the link fiber 30, and after selection by the filter 20, the optical signal at wavelength $\lambda_1$ is received by the intermediate fiber 13 within which the signal is guided, while the optical signal at wavelength $\lambda_2$ is received by the intermediate fiber 14 within which the signal propagates by being guided therealong.

Figure 4:
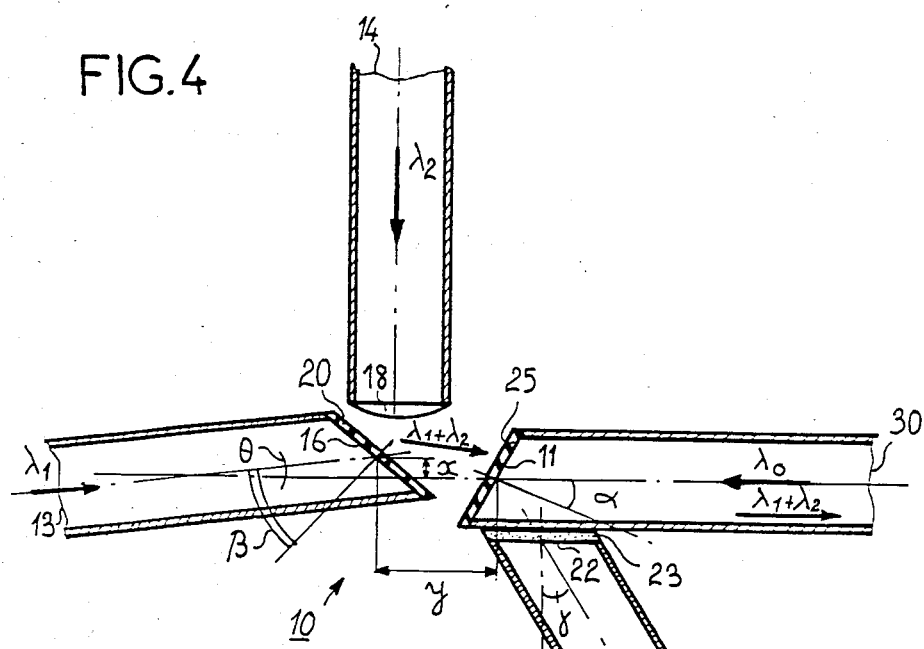
FIGS. 4 and 5 are respective longitudinal sections through an associated multiplexer and demultiplexer in accordance with the invention for a bidirectional link having three channels, including two go channels and one return channel.
Figure 5:
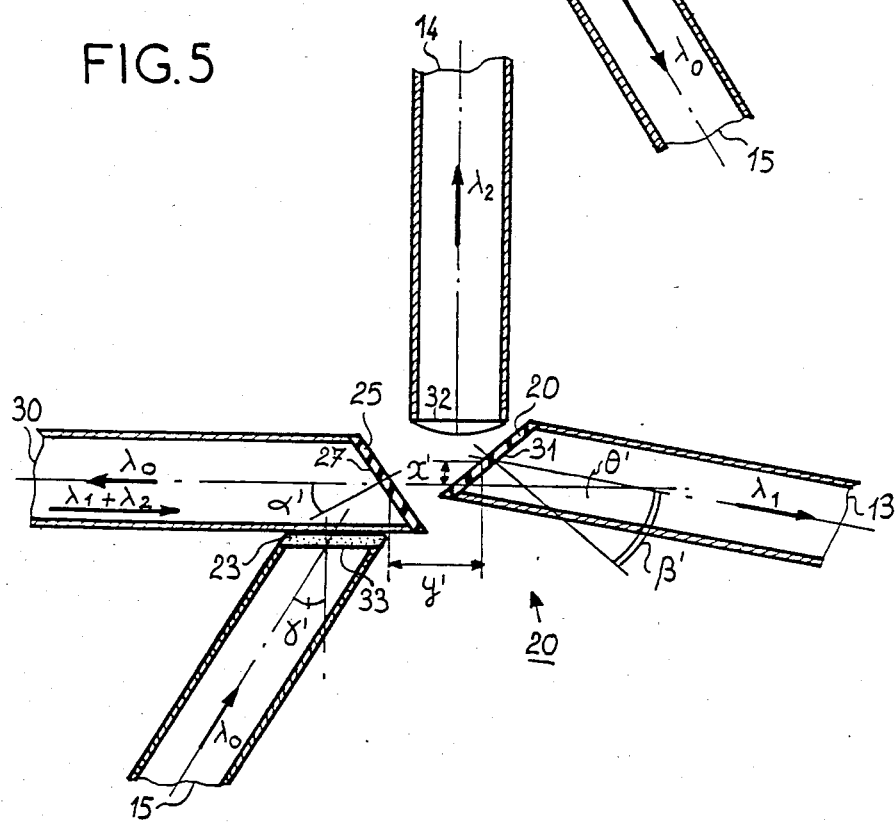

FIGS. 4 and 5 respectively show a multiplexer 10 and an associated demultiplexer 20 in accordance with the invention for use in a bidirectional link having three channels, comprising two go channels and one return channel.

By way of example, the two go channels in this interactive link are at two different wavelengths $\lambda_1$ which is equal to 0.86 μm for example, and $\lambda_2$ which is equal to 1.3 μm for example, while the return channel transmits at a wavelength $\lambda_0$ which is different from the other two and equal, for example, to 0.78 μm.

This multiplexer-demultiplexer for a bidirectional link is not described in detail since its structure is analogous to that of the unidirectional multiplexer-demultiplexer described above with reference to FIGS. 2 and 3.

For the bidirectional optical multiplexer 10 shown in FIG. 4, the chamfered face of the link fiber 30 serves both as an inlet face for the two go wavelengths $\lambda_1$ and $\lambda_2$ and as an outlet face for the return wavelength $\lambda_0$. The interference filter 20 on the chamfered face of the intermediate fiber 13 is designed as before and multiplexes the two go wavelengths $\lambda_1 + \lambda_2$ by wavelength separation, while the interference filter 25 on the chamfered inlet/outlet face of the link fiber 30 serves firstly to transmit the optical signal at the two go wavelengths into the link fiber and also to reflect the optical signal at the return wavelength $\lambda_0$. After reflection, this return optical signal on wavelength $\lambda_0$ leaves the link fiber through its side wall and is received by the intermediate fiber 15 along which it propagates. The chamfer angle $\alpha$ of the link fiber 30 is such that the optical signal at the return wavelength $\lambda_0$, once reflected by the filter 25 and after being received by the filter 15, remains guided therein.

Similarly, in the bidirectional demultiplexer 20 shown in FIG. 5, the chamfered face of the link fiber 30 serves both as the outlet face for the two multiplexed go wavelengths $\lambda_1$ and $\lambda_2$ and as an inlet face for the return wavelength $\lambda_0$. The interference filter 25 on the chamfered inlet/outlet face of the link fiber 30 is designed as before and serves to transmit the two go wavelengths $\lambda_1$ and $\lambda_2$ and to reflect the return wavelength $\lambda_0$ which enters via the side wall of the link fiber 30. The chamfer angle $\alpha'$ of the link fiber 30 is such that the optical signal at the return wavelength $\lambda_0$ is guided along the link fiber after being reflected by the filter 25.

At the output from the interference filter 25, the optical signal at the two go wavelengths $\lambda_1 + \lambda_2$ is received by refraction by the filter 20 on the chamfered face of the intermediate fiber 13. The filter 20 is designed as before and serves to transmit the optical signal at the first go wavelength $\lambda_1$ in the intermediate fiber 11 and to reflect the optical signal at the second go wavelength 2 which is received by the intermediate fiber 14 and which propagates therealong and is guided thereby. Thus, the interference filter 20 selectively separates the two go wavelengths $\lambda_1$ and $\lambda_2$.

We claim:

1. A wavelength multiplexer for a unidirectional link comprising a link optical fiber for transmitting an optical signal including at least three multiplexed wavelengths and having an inlet face and an outlet face and at least three intermediate optical fibers disposed adjacent the inlet face of the link fiber and each having an inlet face and an outlet face for emitting a wavelength, wherein the inlet face of the link fiber and the outlet face of the first intermediate fiber transmitting an optical signal at a first wavelength are each chamfered at a given angle and are coupled to each other in such a manner that the respective longitudinal axes of the link fiber and the first intermediate fiber are distinct, wherein the outlet face of a second intermediate fiber transmitting an optical signal at a second wavelength is coupled to the chamfered face of the first intermediate optical fiber on which a first interference filter is disposed, said filter being designed to transmit the optical signal at the first wavelength and to reflect the optical signal at the second wavelength, each of said signals being intended to penetrate into the link fiber via its chamfered face, wherein the outlet face of a third intermediate fiber transmitting an optical signal at a third wavelength is applied to the cylindrical wall of the link fiber by optical means having a refractive index matching that of each of these two fibers, and wherein a second interference filter is disposed on the chamfered face of the link fiber and is designed to transmit the optical signals at the first and second wavelengths from the output of the first filter and to reflect optical signals at the third wavelength, thereby multiplexing three wavelengths in the link fiber.

2. A multiplexer according to claim 1, wherein the chamfer angle of the inlet face of the link fiber is such that the optical signal at the third wavelength remains guided inside the said link fiber, after reflection by the second filter.

3. A wavelength demultiplexer for a unidirectional link comprising a link optical fiber transmitting an optical signal including at least three multiplexed wavelengths and having an inlet face and an outlet face and at least three intermediate optical fibers disposed adjacent the outlet face of the link fiber and each having an inlet face for receiving a wavelength and an outlet face, wherein the outlet face of the link fiber and the inlet face of the first intermediate fiber for transmitting an optical signal at a first wavelength are each chamfered at a given angle and are coupled to each other in such a manner that the respective longitudinal axes of the link fiber and the first intermediate fiber are distinct, wherein the inlet face of a second intermediate fiber for transmitting an optical signal at a second wavelength is coupled to the chamfered face of the first intermediate optical fiber, wherein the inlet face of a third intermediate fiber for transmitting an optical signal at a third wavelength is applied to the cylindrical wall of the link fiber by optical means having a refractive index matching that of each of these two fibers, wherein a first interference filter is disposed on the chamfered face of the link fiber and is designed to transmit optical signals at the first and second wavelengths output from the said chamfered face and to reflect optical signals at the third wavelength to be received by the third intermediate fiber, and wherein a second interference filter is disposed on the chamfered face of the first intermediate fiber and is designed to transmit the optical signal at the first wavelength from the first filter to be received by the first intermediate fiber and to reflect the optical signal at the second wavelength output from the first filter to be received by the second intermediate fiber, thereby demultiplexing the three wavelengths.

4. A demultiplexer according to claim 3, wherein the chamfer angle of the outlet face of the link fiber is such that the optical signal at the third wavelength remains guided inside the said third intermediate fiber, after being reflected by the first filter and being received by the third intermediate fiber.

5. A wavelength multiplexer for a bidirectional link comprising a link optical fiber for transmitting an optical signal including at least two multiplexed wavelengths in a "go" direction and for transmitting an optical signal including at least one wavelength in the opposite or "return" direction, the link fiber having a face serving both as an inlet face for the go wavelengths and as an outlet face for the return wavelength(s) and at least three intermediate optical fibers disposed adjacent the inlet/outlet face of the link fiber and each having an inlet face and an outlet face, wherein the inlet/outlet face of the link fiber and the outlet or go wavelength emission face of a first intermediate fiber transmitting an optical signal at a first go wavelength are each chamfered at a given angle and are coupled to each other in such a manner that the respective longitudinal axes of the link fiber and the first intermediate fiber are distinct, wherein the "emission" face of a second intermediate fiber transmitting an optical signal at a second go wavelength is coupled to the chamfered face of the first intermediate optical fiber on which a first interference filter is disposed, said filter being designed to transmit the optical signal at the first go wavelength and to reflect the optical signal at the second go wavelength, each of said signals being intended to penetrate into the link fiber via its chamfered face, wherein the inlet face for receiving a return wavelength of a third intermediate fiber for transmitting an optical signal at the return wavelength is applied to the cylindrical wall of the link fiber by optical means having a refractive index matching that of each of these two fibers, and wherein a second interference filter is disposed on the chamfered face of the link fiber and is designed to transmit the optical signals at the first and second go wavelengths from the outlet of the first filter and to reflect optical signals at the return wavelength to be received by the third intermediate fiber.

6. A multiplexer according to claim 5, wherein the chamfer angle of the inlet/outlet face of the link fiber is such that the optical signal at the return wavelength remains guided inside the said third intermediate fiber, after being reflected by the second filter, and received by the third intermediate fiber.

7. A multiplexer according to claim 1, 2, 5 or 6, wherein the respective longitudinal axes of the link fiber and of the first intermediate fiber intersect, and wherein the coupling between the first intermediate fiber and the link fiber is defined by the angle $\theta$ between their respective longitudinal axes, by the distance x along a direction orthogonal to the longitudinal axis of the link fiber between the respective centers of the chamfered faces of the link fiber and of the first intermediate fiber, and by the distance y along a direction parallel to the axis of the link fiber between the said centers, said distance y being such that the second intermediate fiber is disposed between the link fiber and the first intermediate fiber and is coupled to the first intermediate fiber.

8. A wavelength demultiplexer for a bidirectional link comprising a link optical fiber for transmitting an optical signal including at least two multiplexed wavelengths in a "go" direction and for transmitting an optical signal including at least one wavelength in the opposite or "return" direction, the link fiber having a face serving both as an outlet face for the go wavelengths and as an inlet face for the return wavelength(s), and at least three intermediate optical fibers disposed adjacent the inlet/outlet face of the link fiber and each having an inlet face and an outlet face, wherein the inlet/outlet face of the link fiber and the inlet or go wavelength receive face of a first intermediate fiber for transmitting an optical signal at a first go wavelength are each chamfered at a given angle and are coupled to each other in such a manner that the respective longitudinal axes of the link fiber and the first intermediate fiber are distinct, wherein the "receive" face of a second intermediate fiber for transmitting an optical signal at a second go wavelength is coupled to the chamfered face of the first intermediate optical fiber, wherein the outlet face for emitting a return wavelength from a third intermediate fiber transmitting an optical signal at the return wavelength is applied to the cylindrical wall of the link fiber by optical means having a refractive index matching that of each of these two fibers, wherein a first interference filter is disposed on the chamfered face of the link fiber and is designed to transmit the optical signals at the first and second go wavelengths from said chamfered face and to reflect optical signals at the return wavelength into the link fiber, and wherein a second interference filter is disposed on the chamfered face of the first intermediate fiber, said second filter being designed to transmit the optical signal at the first go wavelength at the outlet from the first filter to be received by the first intermediate fiber and to reflect the optical signal at the second go wavelength at the outlet from the first filter to be received by the second intermediate filter.

9. A multiplexer according to claim 8, wherein the chamfer angle of the inlet/outlet face of the link fiber is such that the optical signal at the return wavelength remains guided inside the link fiber, after being reflected by the first filter.

10. A multiplexer according to claim 3, 4, 8 or 9, wherein the respective longitudinal axes of the link fiber and of the first intermediate fiber intersect, and wherein the coupling between the first intermediate fiber and the link fiber is defined by the angle $\theta'$ between their respective longitudinal axes, by the distance x' along a direction orthogonal to the longitudinal axis of the link fiber between the respective centers of the chamfered faces of the link fiber and of the first intermediate fiber, and by the distance y' along a direction parallel to the axis of the link fiber between the said centers, said distance y' being such that the second intermediate fiber is disposed between the link fiber and the first intermediate fiber and is coupled to the first intermediate fiber.

* * * * *